G. A. STANTON.
SPRING SUSPENSION FOR VEHICLES.
APPLICATION FILED JULY 18, 1917.

1,259,797.

Patented Mar. 19, 1918.

Inventor
Gay A. Stanton
By S. E. Thomas
Attorney

UNITED STATES PATENT OFFICE.

GAY A. STANTON, OF BATTLE CREEK, MICHIGAN.

SPRING SUSPENSION FOR VEHICLES.

1,259,797.

Specification of Letters Patent.

Patented Mar. 19, 1918.

Application filed July 18, 1917. Serial No. 181,205.

*To all whom it may concern:*

Be it known that I, GAY A. STANTON, citizen of the United States, residing at Battle Creek, county of Calhoun, State of Michigan, have invented a certain new and useful Improvement in Spring Suspensions for Vehicles, and declare the following to be a full, clear, and exact description of the same, such as will enable others skilled in the art to which it pertains to make and use the same, reference being had to the accompanying drawings, which form a part of this specification.

My invention relates to a spring suspension for vehicles adapted for either motor drawn or horse drawn conveyances, as shown in the accompanying drawings and more particularly set forth in the following specification and claims.

One object of this invention is to simplify and improve the construction of the spring suspension device shown in U. S. Patent No. 1,162,414 issued to me November 30, 1915.

One feature of the present invention is the means provided for regulating the tension of the springs to meet varying load conditions: the swinging arms being notched at spaced intervals to receive the looped end of the rods supporting the springs.

Another feature of the invention is the telescoping dust caps inclosing the springs.

Other advantages and improvements will hereafter appear as this description proceeds, the invention residing in the combination and arrangement of parts and in the details of construction hereinafter described and claimed, it being understood that changes may be made in the precise embodiment herein disclosed without departing from the spirit of the invention.

Figure 1:
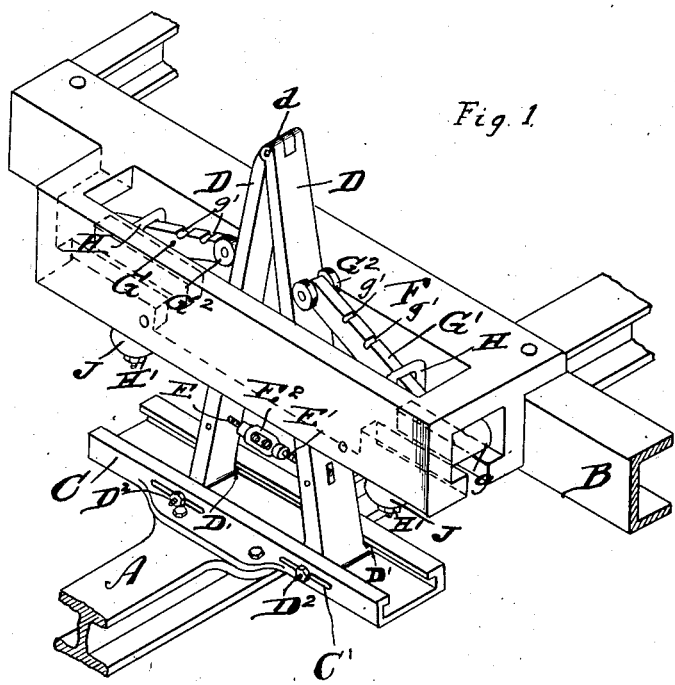

In the accompanying drawings:—Figure 1 is a fragmetary perspective view indicating a vehicle axle, an adjustable wedge supported thereon, a portion of a vehicle frame, arms pivoted to the frame their free ends provided with rolls bearing against the wedge, and springs suspended from hangers adapted to be adjustably supported in spaced notches formed in the edge of the pivoted arms.

Figure 2:
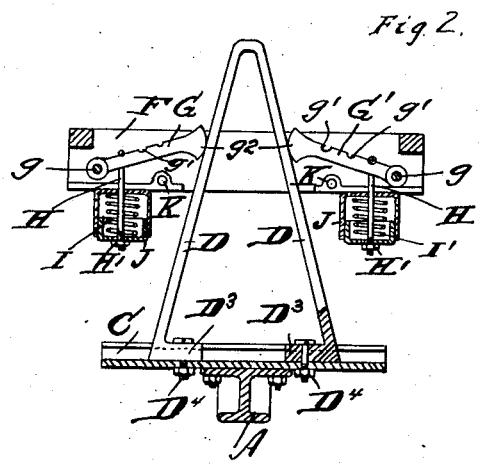

Fig. 2 is a cross-sectional view through the axle of a vehicle showing a modification of the device.

Referring now to the letters of reference placed upon the drawings;—A, denotes the axle of a vehicle, B, its frame or chassis. C, is a slotted channel member bolted transversely to the axle A.

D, D, are upright members inclined toward each other and pivoted together at the top at $d$, to form a wedge, each member being provided with trunnions D', slidable in the channel member C. $D^2$, are bolts projecting through the trunnions D', and channel members C, to secure the uprights against displacement when adjusted.

E, E', are right and left bolts respectively engaged to the inclined upright members and connected together by a turnbuckle $E^2$, upon adjusting which, the uprights may be drawn toward each other or spaced apart.

F, is a member bolted to the frame B, having an elongated slot through which the inclined members D, D, forming the wedge project:—If preferred, however, the member F, may be an integral part of the frame.

G, G', are swinging arms pivoted at $g$, to the plate F, their free ends fitted with rolls $G^2$, which bear against the inclined upright members D, D. H, denotes adjustable hangers adapted to be suspended from the spaced notches $g'$, $g'$, formed in the edge of the swinging arms G, and G'.

I, I', indicate springs supported by the hangers H, and are preferably housed within telescoping cups J, to keep out dust or grit. H', is a nut engaging the end of the hangers;—by adjusting which the tension of the springs may be increased or diminished.

K, are stops carried by the plate F, to limit the downward movement of the swinging arms G, G':—Like stops may also be employed to limit the upward movement of the arms if desired.

In the modification shown in Fig. 2, a non-adjustable wedge is indicated having foot pieces $D^3$, secured to the channel member C, by bolts $D^4$:—and in place of the swinging arms being fitted with rolls at their free ends to bear against the inclined surface of the wedge, the arms are formed with an arc-shaped end $g^2$, adapted to engage the wedge.

Having indicated the several parts by reference letters, the construction and operation of the device will be readily understood.

Upon the front and rear axle, on each side of the vehicle, are respectively mounted the wedges formed by the inclined adjustable upright members. To the chassis frame directly over the front and rear axle on each side of the vehicle, are bolted the slotted plates F, in which is pivoted the swinging arms G and G', carrying the antifriction rolls G², which bear directly against the inclined faces of the wedge. In order that the device may be adapted to meet the requirements of varying load conditions, the inclined members forming the wedge are adjusted by means of the turnbuckle E², to provide a wedge of greater or less angularity that the swinging arms, controlled by the springs suspended therefrom by adjustable hangers, may be actuated to a greater or less extent in accordance with the load carried.

It will be noted that the hangers supporting the springs may be shifted so as to rest in any of the several notches provided in the swinging arms and thereby vary the tension of the springs. While only one spring is shown engaged with each of the swinging arms, a plurality of springs may be connected therewith if desired.

The tension of the springs may also be regulated by adjusting the nut H', engaging the end of the hangers.

It will be apparent that the frame of the vehicle is suspended through the contact of the yieldable swinging arms with the wedge-shaped members;—the degree of oscillation being limited by the stops K.

By providing swinging arms adapted to engage the wedge controlled by vertically disposed springs, (in lieu of the horizontally arranged springs shown in my former patent) a more positive action of the parts is obtained and accidental dislodgment of the springs from their supporting frames through lateral thrust occasioned by the oscillation of the vehicle is avoided.

Having thus described my invention, what I claim is:—

1. In a device of the character described, a wedge-shaped member, means for supporting the wedge-shaped member adapted to be secured to the axle of a vehicle, a slotted frame through which the wedge-shaped member projects, opposing arms pivoted to the slotted frame adapted to bear upon the inclined surfaces of the wedge-shaped member to support the frame, and springs suspended from the opposing arms adapted to yieldingly maintain the latter in contact with the wedge, whereby the frame may be free to oscillate.

2. In a device of the character described, an adjustable wedge-shaped member, means for supporting the wedge-shaped member carried by the axle of a vehicle, a slotted member carried by the frame of the vehicle adapted to receive the wedge-shaped member, opposing arms pivoted to the slotted member their free ends bearing upon the inclined surfaces of the wedge to support the vehicle frame, and springs supported by movable hangers suspended from said arms, adapted to yieldingly maintain the free end of the arms in contact with the wedge, whereby the frame may be free to oscillate.

3. In a device of the character described, a wedge-shaped member, means for supporting the wedge-shaped member upon the axle of a vehicle, a slotted member carried by the frame of the vehicle adapted to receive the wedge-shaped member, opposing arms pivoted to the slotted member, rolls carried by the free end of said arms for contact with the inclined walls of the wedge-shaped member, movable spring hangers suspended from said opposing arms, and vertically disposed coiled springs supported by said hangers, adapted to yieldingly maintain the rolls carried by said arms in contact with the wedge.

4. In a device of the character described, a wedge-shaped member, means for supporting the wedge-shaped member upon the axle of a vehicle, a slotted member carried by the frame of the vehicle through which the wedge-shaped member projects, opposing arms pivoted to the slotted member and bearing upon the inclined walls of the wedge, said arms provided with a plurality of spaced notches to receive a movable spring hanger, spring hangers suspended from said arms, vertically disposed coiled springs supported by said hangers adapted to yieldingly maintain the arms in contact with the wedge-shaped member, and a telescoping closure for said springs supported by said hangers.

5. In a device of the character described, a wedge-shaped member, means for supporting the wedge-shaped member upon the axle of a vehicle, a slotted frame through which the wedge-shaped member projects, opposing arms pivoted to the slotted frame having their free ends in contact with the inclined walls of the wedge-shaped member, movable spring hangers suspended from said arms, springs carried by said hangers, means adjustable upon said hangers for regulating the tension of the springs, and means for limiting the movement of the swinging arms.

In testimony whereof, I sign this specification in the presence of two witnesses.

GAY A. STANTON.

Witnesses:
 GEO. CANRIKE,
 ANNA E. RILEY.